United States Patent [19]

Nishikawa et al.

[11] Patent Number: 4,491,840
[45] Date of Patent: Jan. 1, 1985

[54] INTERVEHICLE DISTANCE CONTROL SYSTEM FOR VEHICLES

[75] Inventors: Masao Nishikawa, Tokyo; Takashi Aoki, Saitama, both of Japan

[73] Assignee: Honda Giken Kogyo Kabushiki Kaisha, Tokyo, Japan

[21] Appl. No.: 365,159

[22] Filed: Apr. 5, 1982

[30] Foreign Application Priority Data

Apr. 7, 1981 [JP] Japan .................................. 56-52631

[51] Int. Cl.³ ................................................ G08G 1/00
[52] U.S. Cl. ..................................... 340/903; 180/169; 180/177; 340/53; 340/62; 340/933; 364/426; 367/909
[58] Field of Search ................... 91/6; 92/48; 180/167, 180/169, 176, 177; 340/31 R, 32, 33, 53, 62, 903, 933; 367/99, 909, 93, 94; 364/426

[56] References Cited

U.S. PATENT DOCUMENTS

| | | | |
|---|---|---|---|
| 2,804,160 | 8/1951 | Rashid | 180/169 |
| 2,840,094 | 6/1958 | Taplin | 92/48 |
| 3,485,316 | 12/1969 | Slavin | 180/176 |
| 3,763,954 | 10/1973 | Permut | 180/167 |
| 4,079,802 | 3/1978 | Kawata | 340/53 |

Primary Examiner—James J. Groody
Assistant Examiner—Michael F. Heim
Attorney, Agent, or Firm—Irving M. Weiner; Pamela S. Burt; Anthony L. Cupoli

[57] ABSTRACT

An intervehicle distance control system for a vehicle which, when there exists a possibility of collision between the vehicle and an interfering object ahead thereof, generates a control signal and imparts to a vehicle accelerator member an operation reaction force corresponding to the control signal. The driver is thereby alerted as to a possibility of collision, while the selection of acceleration operation is substantially entrusted to the driver. In the absence of such control signal, the reaction force has a strength of substantially zero. Regardless of the vehicle speed, the driver will never suffer from a metal burden due to operation of the control system.

8 Claims, 5 Drawing Figures

INTERVEHICLE DISTANCE CONTROL SYSTEM FOR VEHICLES

BACKGROUND OF THE INVENTION

1. Field of the Invention

The present invention relates generally to an intervehicle distance control system for vehicles. More particularly, the invention relates to an intervehicle distance control system for vehicles having accelerator means to which operation is imparted by a reaction force of a strength corresponding to the possibility of collision between a vehicle in question and an interfering object disposed in the path of travel of the vehicle.

2. Description of Relevant Art

There have already been known various intervehicle distance control systems for vehicles wherein the distance between a vehicle in question (i.e., one provided with such a system) and an interfering object disposed in the path of travel of the vehicle, and the relative speed therebetween, are measured by means of radar or the like, and a braking operation is automatically applied to the vehicle in question on the basis of a comparison between values thus obtained and reference values, to thereby avoid collision with the object.

In such conventional automatic braking type intervehicle distance control systems, however, when there has arisen a difference between a uniform judgment of a braking signal generating processor and a collision avoiding scenario pictured in the driver's mind on the basis of his perception and experience, in the interest of safety priority has in many cases been assigned to the processor's judgment. Consequently, such conventional systems require improvements in consideration of vehicles located behind the vehicle in question, or from the standpoint of the driver's mental well-being.

In view of the foregoing, there has been proposed, in U.S. patent application Ser. No. 309,018 filed on Oct. 6, 1981, an intervehicle distance control system for vehicles wherein an operation reaction force of a strength corresponding to the possibility of collision between a vehicle in question and an interfering object in the path of travel of the vehicle is imparted to accelerator means in the form of a throttling pedal. The driver is thereby made aware of the possibility of collision, while the selection of accelerator operation is substantially left to the driver's discretion.

However, even the aforesaid acceleration reaction force type intervehicle distance control system still has room for improvement in the following respects. Such control system utilizes a pulse motor or oil pressure as means for generating the acceleration reaction force. In the case of a pulse motor, an artificial displacement, once analogously produced thereon, is converted to a force through a spring, so that the spring constant of the spring is normally fed back to the stroke of the throttling valve and, as this pedal is depressed through a stroke thereof by the driver's foot, the reaction force will increase even when the system is not in operation, which may result in a mental burden on the driver during high-speed driving. On the other hand, in the case of utilizing oil pressure, the provision of an exclusive hydraulic pump is an additional requirement, so that the system becomes more complicated and larger in size. Further, the pump driving power is remarkably large, and consequently the system tends to be less economical. In such an oil pressure type, moreover, a sufficiently light feeling of the accelerating operation is sometimes not obtainable because of the designing of such system to require the driver to sense by feeling the piston sliding resistance at the cylinder portion by way of the pedal.

The present invention effectively overcomes the above described problems attendant the aforesaid acceleration reaction force type intervehicle distance control system.

SUMMARY OF THE INVENTION

The present invention provides an intervehicle distance control system for a vehicle, comprising a signal generating mechanism for generating, when there exists a possibility of collision between the vehicle and an interfering object disposed in the path of travel of the vehicle, a control signal corresponding to the degree of such possibility; an acceleration mechanism having an accelerator member for increasing the vehicle speed according to a displacement in a predetermined operational direction of the accelerator member from an original position thereof; and a reaction force mechanism for urging the accelerator member in the direction opposite to the operating direction thereof with a reaction force of a strength corresponding to the control signal, in which the reaction force has a strength of substantially zero when the control signal is absent.

It is an object of the present invention to provide an intervehicle distance control system for vehicles which imposes substantially no mental burden upon the driver, regardless of the vehicle speed.

The above and further objects, features and advantages of the invention will become apparent from the following description of preferred embodiments when read in conjunction with the accompanying drawings.

DETAILED DESCRIPTION OF PREFERRED EMBODIMENTS

Figure 1:
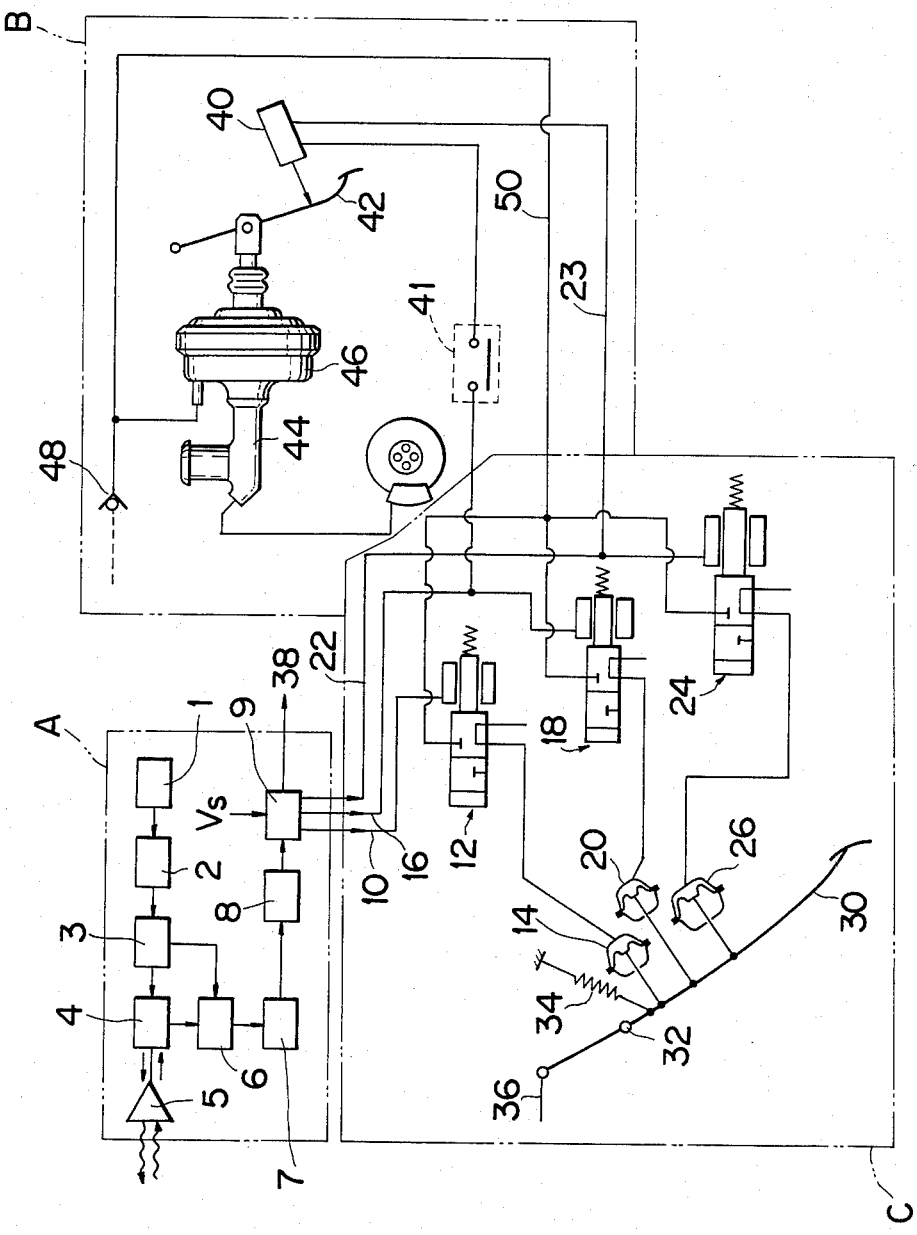
FIG. 1 is a block diagram of an intervehicle distance control system for vehicles in accordance with a first embodiment of the present invention.

With reference to FIG. 1, the intervehicle distance control system in accordance with a first embodiment of the present invention comprises a system A which measures the distance from a preceding vehicle and the relative velocity by means of radar and compares the measured values with reference values, a braking system B which effects the braking operation in an emergency either automatically or by way of a manual operation, and an acceleration reaction force control system C which urges a throttling pedal to the idle position thereof on the basis of control signals transmitted from the system A.

In this embodiment, the radar used in the system A is an FM-CW type radar, in which a carrier frequency $f_0$ from an oscillator 1 is modulated at a predetermined frequency by a modulator 2, the modulated output is transmitted to an antenna 5 through a directional coupler 3 and a circulator 4, and radio waves are radiated from the antenna 5 toward a preceding object. Reflected waves from the objects are received by the antenna 5 and sent again through the circulator 4 to a mixer 6, where the reflected waves are mixed with the modulated waves as branched from the directional coupler 3 to create a signal of a beat frequency $f_R$. This weak beat frequency signal is amplified to a predetermined voltage level by a video amplifier 7, the amplified signal is transmitted to a frequency counter 8, where the frequency is read out, and this read-out value of beat frequency is fed to a signal processing device 9. In the signal processing device 9, an intervehicle distance X and a relative velocity $V_R$ are calculated on the basis of the read-out beat frequency value, and a proper intervehicle distance $X_S$ at that time is given on the basis of a velocity signal $V_S$ transmitted from the vehicular speedometer and the relative velocity $V_R$ and according to a predetermined functional relationship wherein $(V_S - V_R)$, substantially equivalent to the proper intervehicle distance characteristics, are stored in advance. This proper intervehicle distance $X_S$ is then compared with the actual intervehicle distance X.

When $(X_S - X)$ exceeds a first critical value, e.g., zero, a first output signal 10 is issued to energize a first solenoid valve 12 to actuate a first throttle controller 14, thereby urging a vehicle accelerator means in the form of a throttling pedal 30 to the idle position thereof.

If $(X_S - X)$ further increases and exceeds a second critical value, the processing device 9 generates a second output signal 16 to energize a second solenoid valve 18 to actuate a second throttle controller 20, thereby urging the throttling pedal 30 to the idle position thereof with a strong force.

If the distance from the preceding vehicle further decreases and the $(X_S - X)$ value greatly increases and exceeds a third critical value at which a collision will soon become unavoidable, the processing device 9 generates a third output signal 22 to energize a third solenoid valve 24 to actuate a relatively large throttle controller or retarder 26, thereby bringing the throttling pedal 30 back to the idle position with a sufficiently strong force, and at the same time, with a signal 23 branched from the third output signal 22, an emergency brake actuator 40 is operated to effect a rapid braking operation.

The throttling pedal 30 is pivotably supported by a vehicle body portion (not shown) about a pivot point 32 and is resiliently supported so as to return to the idle position thereof by a return spring 34 suspended from the vehicle body. If the driver treads the lower portion of the pedal 30 to pivot the pedal clockwise in FIG. 1 about the pivot point 32, a throttle wire 36 connected to the upper end of the pedal 30 is pulled to the right in FIG. 1 to open a butterfly valve within a carburetor (not shown), thereby increasing the rpm of an engine (not shown).

The throttle controllers 14 and 20 are of the same structure and size, while the retarder 26 is larger in size. Actuators for the throttle controllers 14, 20 and the retarder 26 all comprise diaphragm type vacuum actuators which utilize as their vacuum source a negative pressure produced in the intake pipe of the engine.

The processing device 9, when generating the output signals 10, 16 and/or 22, further generates a fourth output signal 38 proportional to the $(X_S - X)$ value to actuate braking lamps (not shown) mounted at the rear of the vehicle at a luminance proportional to $(X_S - X)$, thereby allowing drivers of any vehicles located rearwardly of the vehicle in question to anticipate the possibility of braking their own vehicles to effectively avoid a rear-end collision with the vehicle in question as well as with other vehicles. The fourth output signal 38 may also be employed as an input of an auto-cruising device or the like.

The emergency brake actuator 40 in this embodiment is of a type which directly urges the throttling pedal 30 using an oil pressure or air pressure as an actuating transmitting means. The emergency brake actuator 40 may alternatively comprise a mechanism which directly controls the pressure difference across a piston (not shown) within a vacuum force multiplier 46 which effects a force multiplication operation between a braking master cylinder 44 and a braking pedal 42. A line from the emergency brake actuator 40 and the line of the second output signal 16 are connected through a limit switch 41 which is adapted to close when the throttling pedal 30 reaches the idle position thereof.

The negative pressure in the intake pipe of the engine is conducted to the vacuum force multiplier 46 through a one-way valve 48, and the negative pressure behind the one-way valve 48, i.e., at the right side in FIG. 1, is conducted through a conduit 50 to the input sides (first connection ports) of the solenoid valves 12, 18 and 24. Therefore, as will be described hereinbelow, the force multiplier 46 per se functions also as a vacuum tank for the accelerator reaction force control system C.

Each of the solenoid valves 12, 18 and 24 also includes, in addition to the aforesaid first connection port, a second connection port communicating with the atmosphere, a third connection port connected to an actuator as described hereinbelow, and switching means for connecting the third connection port selectively to the first and second connection ports.

Figure 2:
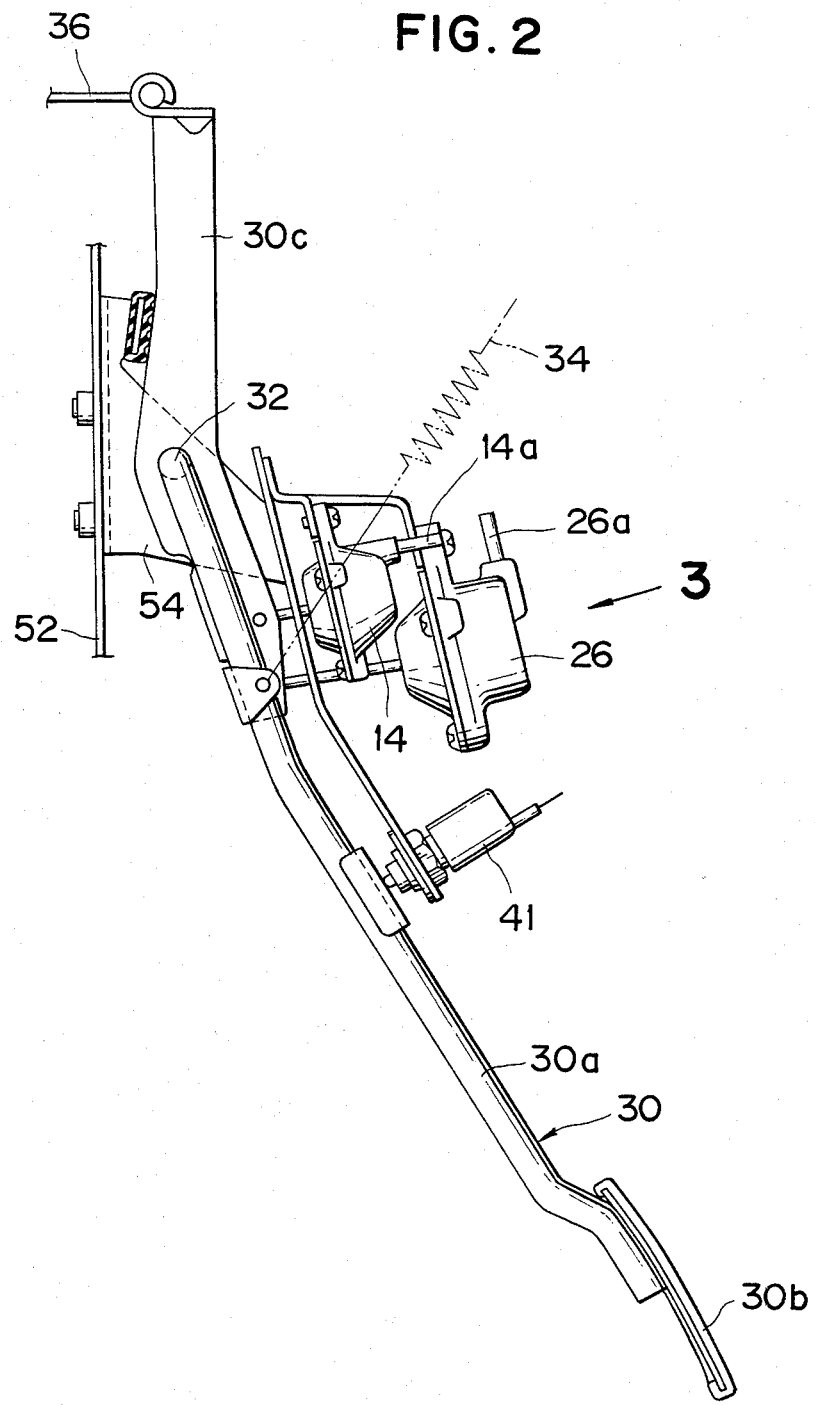
FIG. 2 is a side view of a throttling pedal portion of the intervehicle distance control system of FIG. 1.
Figure 3:
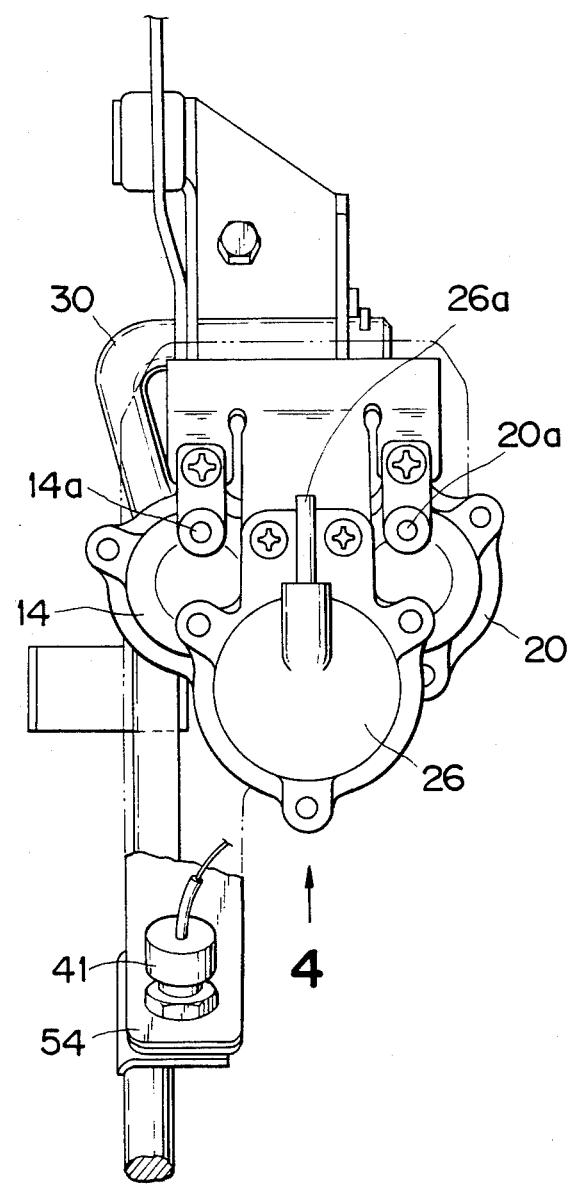
FIG. 3 illustrates a principal part of the throttling pedal portion as viewed from the direction of arrow 3 in FIG. 2.
Figure 4:
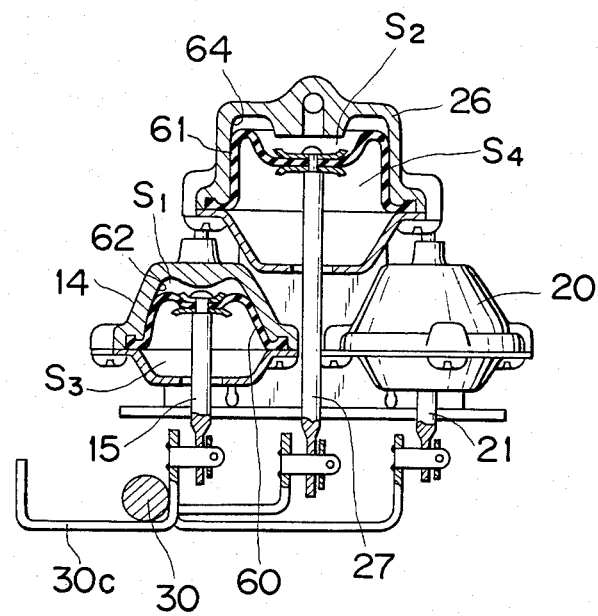
FIG. 4 is a partially sectioned view showing a principal part of the throttling pedal portion as viewed from the direction of arrow 4 in FIG. 3.

Referring now to FIGS. 2 through 4, there are shown details of construction of the throttling pedal 30 and its surrounding structure. The throttling pedal 30 is of a welded structure comprising a round bar 30a and a plate 30b and is supported pivotably at the pivot point 32 of a bracket 54 which is fixed with machine screws to a boundary wall 52 between a passenger compartment in the vehicle body and an engine space (neither shown). The throttling pedal 30 is interlocked with a support arm 30c. On a stay extending from the bracket 54 are fixed the throttle controllers 14, 20 and the retarder 26, and the lower ends of operating rods 15, 21 and 27 extending downwardly from the throttle controllers 14, 20 and the retarder 26, respectively, are fixed at the throttling pedal 30 side as shown in FIG. 4. In the controllers 14, 20 and the retarder 26 there are formed ports 14a, 20a and 26a for communication with the third connection ports of the solenoid valves 12, 18 and 24, respectively. In this embodiment, the solenoid valves 12, 18 and 24 are mounted to the bracket 54, but where space does not permit such arrangement, they may be disposed within the passenger compartment in positions proximal the bracket 54.

The controllers 14, 20 and the retarder 26 are each formed of bowl-shaped upper and lower casings joined together with machine screws, within which are disposed diaphragms 60 and 61 molded from an elastic material such as rubber. The diaphragms 60 and 61 are each fixed at the peripheral edge thereof to the horizontal junction surfaces of the upper and lower casings, as shown in FIG. 4. The diaphragms 60 and 61 define upper inter-casing chambers $S_1$ and $S_2$, respectively, into which is introduced the negative pressure in the intake pipe. These diaphragms also define lower chambers $S_3$ and $S_4$, respectively, which are open to the atmosphere. To central portions of the diaphragms 60 and 61 are fixed the upper ends of the operating rods 15 and 27, respectively, in an airtight manner. The operating rods 15 and 27 extend downwardly through the lower casings and their lower ends are fixed to the support arm 30c which is interlocked with the throttling pedal 30. As clearly shown in FIG. 4, moreover, an inside wall 62 of the upper casing of the throttle controller 14 forms an inverted bowl-like curve, so that as the position of the diaphragm 60 becomes higher, in other words, as the throttling pedal 30 approaches the idle position thereof, the effective pressure receiving area of the diaphragm 60 decreases. On the other hand, an inside wall 64 of the retarder 26 is substantially cylindrical, so that the planar projection area of the diaphragm 61 becomes constant and the effective pressure receiving area of the diaphragm 61 is constant regardless of the position of the throttling pedal 30. The above-described construction of the controller 14 is also applied to the controller 20.

The operation of the above-described system will now be described hereinbelow.

When there is no interfering object in the path of travel of the vehicle in question while the vehicle is travelling, the system A generates no output signal, and thus the three solenoid valves 12, 18 and 24 are not energized and are held in the state shown in FIG. 1. At this time, the throttle controllers 14, 20 and the retarder 26 are not in communication with the force multiplier 46 as their vacuum source, and the throttling pedal 30 is operated with manual forces in the conventional manner. In this operation, a resilient force induced by the bending of the three diaphragms can act as a resistance, while the value thereof is set so small as to be negligible.

When an interfering object appears ahead and as the possibility of a collision therewith becomes greater, the system A generates the output signals 10 and 16 in a stepped manner or digitally, so that the solenoid valves 12 and 18 are energized successively, and at every energization a counterclockwise force in FIGS. 1 and 2 is exerted as an acceleration reaction force upon the throttling pedal 30, thereby alerting the driver to an increased possibility of collision corresponding to the strength of such reaction force and warning him to decrease the vehicle speed. If the driver has determined that he should steer the vehicle so as to avert the interfering object while accelerating rather than decelerating, he can accomplish his intention by depressing the throttling pedal 30 with a force sufficient to overcome the aforesaid acceleration reaction force which is automatically applied. The magnitude of the throttle reaction force can be adjusted easily by changing the effective pressure receiving area of the controllers 14 and 20, or by changing the position of the operating point of the controllers 14 and 20, i.e., the distance of their operating rods 15 and 21 from the pivot point 32. Therefore, it is not necessary to restrict the controllers 14 and 20 to the size and shape shown in the present embodiment, nor is it necessary to make their acting positions on the throttling pedal 30 equidistant from the pivot point 32. In this embodiment, moreover, when the possibility of collision has reached the second stage, the two controllers 14 and 20 together bring the throttling pedal 30 back to the idle position thereof and a combined force of their reaction forces acts on the throttling pedal 30, however, this is not a basic requirement of the present invention. For example, if the controllers 14 and 20 are constructed so that the second controller 20 produces a larger reaction force than that produced by the first controller 14, and both controllers are allowed to act separately according to the possibility of collision, the desired object can be attained. However, the simultaneous action of the controllers 14 and 20 as described in the present embodiment is advantageous in that each controller can be designed to be small in size and the amount of vacuum consumed by each controller is minimal, i.e., the capacity of the force multiplier 46 can be minimized. It is also not necessary to restrict the number of controllers to two, i.e., one or three or more of such controllers may be employed.

When the probability of collision with the forwardly disposed interfering object has risen to a critical level, and if the system A has judged that the collision is unavoidable, the system A causes the retarder 26 to operate to forcibly pull the throttling pedal 30 back to the idle position thereof with a strong force, independently of the driver's will. For this purpose, the capacity of the retarder 26 is made sufficiently large and the position of its operating point with respect to the throttling pedal 30 is set farther from the pivot point 32 than the controllers 14 and 20. The retarder 26 is required only to perform a simple function of returning the throttling pedal 30 to the idle position thereof, and it is constructed so that its effective pressure receiving area is as large as possible and kept uniform with respect to the stroke of the pedal 30. On the other hand, the controllers 14 and 20 are constructed such that their effective pressure receiving areas change with respect to the stroke of the pedal 30. Therefore, when the throttling pedal 30 is depressed strongly, it is possible to advise the driver with a stronger reaction force that an imminence is present.

If the possibility of collision with the forwardly disposed interfering object decreases, the foregoing operation is reversed, i.e., the solenoid valves 12, 18 and 24 are de-energized successively and the retarder 26 and the controllers 20, 14 also become inactive.

The force multiplier 46 shown in FIG. 1 will be described hereinbelow.

When a vehicle is traveling at substantially full speed, or at the time of a rapid acceleration, the throttle valve (butterfly valve) of the carburetor is generally in a fully open state, and in this state the internal pressure of the intake pipe is nearly equal to the atmospheric pressure. Therefore, in order to have the controllers 14, 20 and the retarder 26 operate, it is necessary to provide a vacuum tank for the storage of negative pressure. However, the additional provision of such a vacuum tank is not desirable in view of the restricted space in current vehicles which carry thereon various devices related to exhaust gas treatment and safety.

On the other hand, the braking systems of current vehicles are often provided with a vacuum force multiplier with a view toward diminishing driver fatigue. Because the piston chamber of such a force multiplier is vacuumized at all times, it is desirable from the standpoint of space-saving design to utilize this piston chamber as a power source for the acceleration reaction force control system. The acceleration reaction force control system itself is not used very frequently, and its operation is always effected in the direction of closing the throttle valve, in other words, in the direction in which a negative pressure is recovered in the intake pipe. Therefore, it is desirable to adopt the intake pipe negative pressure as a power source for the control system, and particularly when the retarder 26 is in operation, recovery of the intake pipe negative pressure is ensured.

The operation of the emergency brake actuator 40 and of a switch 41 will now be described. The emergency brake system B is provided as necessary. If a collision is very likely to occur, the system B functions to return the throttling pedal 30 to the idle position thereof with the signal 22 fed from the system A and at the same time to allow a rapid braking operation to be applied automatically, thereby lowering the shock of a collision, should one occur, and keeping damage to a minimum. Even when the probability of collision is relatively high and the system A has generated the second signal 16, if the driver stops treading the throttling pedal 30 so as to allow the pedal 30 to return to the idle position thereof, the switch 41 closes and the emergency brake actuator 40 effects the braking operation. Thus, the time from when the driver stops treading the throttling pedal 30 until he depresses the braking pedal 42 is saved. In this case, the brake actuator 40 is not required to apply a full braking operation, i.e., it may apply a light braking operation, but in any event the driver will have agreed to the deceleration at his discretion.

Although the system A in this embodiment utilizes radar, there may alternatively be employed any other suitable device, provided it judges the magnitude of possibility of a collision with a forwardly disposed object and generates output signals according to the magnitude of such possibility. For example, various other systems utilizing infrared or ultrasonic waves may be employed.

In addition, the retarder 26 is interlocked with the automatic braking system B, so that with its strong reaction force it also functions to effectively cancel a treading force in the direction of acceleration exerted by the driver's foot along with an inertia at the time of the rapid braking operation.

Figure 5:
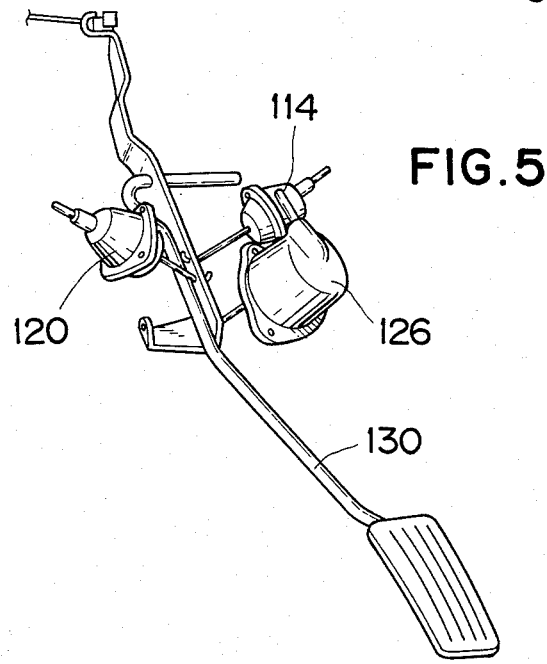
FIG. 5 is a perspective view of a throttling pedal portion of an intervehicle distance control system for vehicles in accordance with a second embodiment of the invention.

With reference now to FIG. 5, which illustrates a second embodiment of the present invention, designated at reference numeral 130 is a throttling pedal. At positions obliquely upwardly with respect to the plane of rotating motion of the pedal 130 there are disposed controllers 114 and 120 with the operating points thereof on the pedal 130 being spaced from each other, the controllers 114 and 120 being fixed to a part of the vehicle body. In a lower position from the controllers 114 and 120 along the axis of the pedal 130 there is disposed a retarder 126.

According to the above construction, without the need of making the effective pressure receiving areas of the controllers variable as in the first embodiment, the moment to be given when returning the pedal 130 to the idle position thereof can be increased along with an increase in the stroke of the pedal 130.

According to the present invention, as will be apparent from the foregoing description, because an intake pipe negative pressure is adopted as means for generating an acceleration reaction force, there is no power loss while the system is not in operation and the feel of the pedal operation is not adversely affected.

Further, the acceleration reaction force is generated stepwise (digitally) according to the magnitude of possibility of collision, and the reaction force in that stage is made variable with respect to the degree of throttle opening (the stroke of the throttling pedal). Therefore, it is possible alert the driver to the degree of danger clearly and effectively.

Furthermore, in the range up to a very substantial probability of collision, an operational priority is imparted to the driver independently of the automatically provided acceleration reaction force, so that the system is high in flexibility and avoids collision effectively by taking pertinent measures according to the particular circumstances.

According to the present invention, moreover, substantially all components to be used can be accommodated in the interior of a vehicle, so that the system can withstand prolqnged use without suffering from external adverse influences caused by muddy water, rain water, salty water, etc. Further, the principal system components, such as solenoid valves and diaphragm type controllers, can be of simplified structure so that it is possible to enhance the reliability of operation.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

1. An intervehicle distance control system for a vehicle, comprising:
    signal generating means for generating, when there exists a possibility of collision between said vehicle and an interfering object ahead thereof, a control signal corresponding to the degree of said possibility;
    accelerator means having an accelerator member for increasing the vehicle speed according to the amount of displacement in a predetermined operating direction of said accelerator member from an original position thereof;
    reaction force means for urging said accelerator member in the direction opposite to said operating direction with a reaction force of a strength corresponding to said control signal;
    said reaction force having a strength of substantially zero when said control signal is absent;
    said control signal comprising a number of alerting signals, said number corresponding to said degree of said possibility of collision;
    said reaction force means comprising at least one solenoid valve adapted to be activated by said control signal and at least one throttle controller adapted to provide said reaction force when said solenoid valve is active;
    said solenoid valve including a first connection port connected to a negative pressure source, a second connection port communicating with the atmosphere, a third connection port connected to said throttle controller and switching means for connecting said third connection port selectively to said first and second connection ports;

said throttle controller including a diaphragm member defining a pressure chamber communicating with said third connection port and a rod member interlocked with said diaphragm member; and wherein:

the maximum number of said alerting signals is n and there are n said solenoid valves and n said throttle controllers as respectively ordered and with respect to an integer $i \leq n$, said solenoid valves and said throttle controllers up to the i-th order become active when said number of said alerting signals is i.

2. A control system according to claim 1, wherein:
said accelerator member comprises a pivotable throttling pedal, and respective ones of said rod members of said n throttle controllers are retained at at least one predetermined position on said throttling pedal.

3. A control system according to claim 2, wherein:
there are n said retaining positions as ordered; and with respect to any integer $j \leq n$, the rod member of the j-th throttle controller is retained to the j-th retaining position.

4. A control system according to claim 3, wherein:
the j+1-th retaining position is spaced further than said j-th retaining position from a pivot center of said throttling pedal.

5. A control system according to claim 2, wherein:
with respect to any integer k where $n > k > 1$, there are k said retaining positions as ordered; and the rod members of the throttle controllers up to the n-1-th order are retained to the retaining positions up to the k-1-th order and the rod member of said n-th throttle controller is retained to the k-th retaining position.

6. A control system according to claim 4 or 5, wherein: n is equal to 3.

7. A control system according to claim 1, wherein:
said strength of said reaction force given by said n-th throttle controller is larger than that given by any of the throttle controllers up to the n-1-th order.

8. A control system according to claim 7, wherein:
the n-th alertng signal serves also as an operating signal for a braking system of said vehicle.

* * * * *